Dec. 15, 1959     W. J. LEE     2,917,097
TUBELESS TIRE VALVE
Filed Sept. 7, 1954
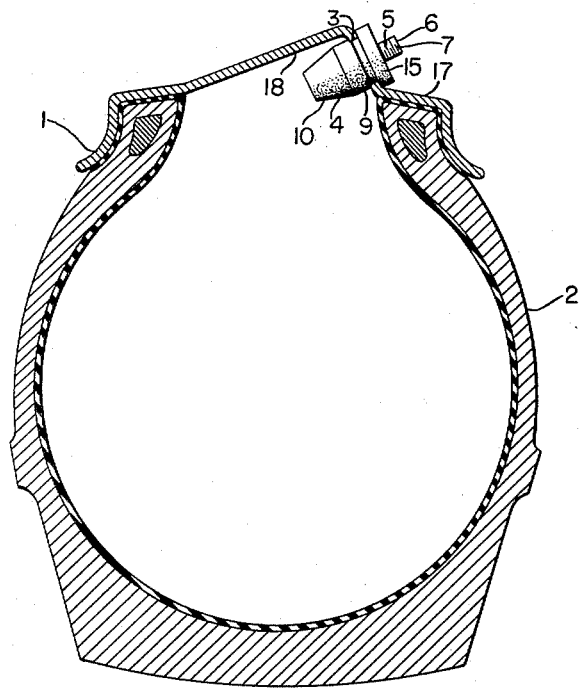
FIG. 1
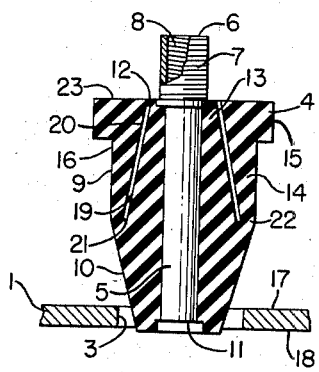
FIG. 2
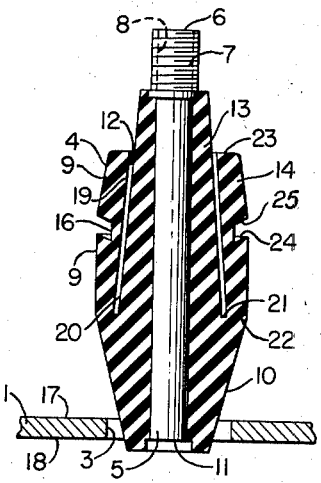
FIG. 3
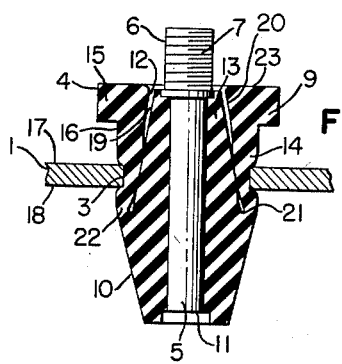
FIG. 4
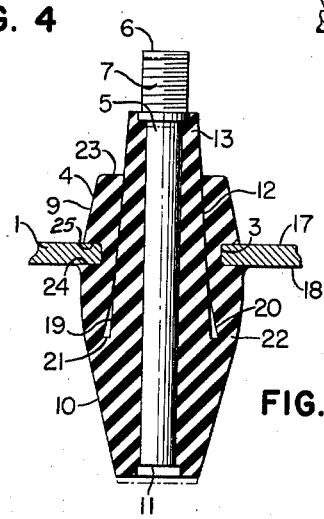
FIG. 5
FIG. 6
*INVENTOR.*
WALTER J. LEE
BY
*R. L. Miller*
ATTORNEY

United States Patent Office 2,917,097
Patented Dec. 15, 1959

2,917,097

TUBELESS TIRE VALVE

Walter J. Lee, Akron, Ohio, assignor to The Goodyear Tire & Rubber Company, Akron, Ohio, a corporation of Ohio Application September 7, 1954, Serial No. 454,580

2 Claims. (Cl. 152—427)

This invention relates to a rubber valve stem and particularly to a rubber valve stem for use with a tubeless tire and rim assembly.

It is an object of the present invention to provide a rubber valve stem which may be easily affixed to and removed from the outer side of a rim for use with tubeless tires. Another object of the invention is to provide a self-sealing and self-retaining rubber valve stem insertable into the valve rim hole from the outer side thereof and provided with a resilient tubular element which is elongated during the inserting operation and compressed by inflationary air pressure acting on the base of the valve to insure that a seal is maintained against the leakage of air through the rim hole under the various forces exerted during operation.

For a better understanding of the invention reference may be made to the accompanying drawings in which:

Fig. 1 is a cross-sectional view taken transversely through a tubless tire and rim assembly and longitudinally through the valve stem embodying the present invention;

Fig. 2 is a longitudinal cross-sectional view of the valve stem embodying the present invention;

Fig. 3 is a cross-sectional view similar to Fig. 2 of another form of the invention;

Fig. 4 is a cross-sectional view of the valve stem shown in Fig. 1 partially inserted into the valve rim hole.

Fig. 5 is a cross-sectional view of the valve stem shown in Fig. 1 completely inserted into valve rim hole with the tire inflated and showing in phantom lines the valve position before the tire has been inflated;

Fig. 6 is a cross-sectional view of the valve stem shown in Fig. 3 mounted upon a rim.

Referring to Fig. 1 of the drawing, numeral 1 indicates a tire rim upon which is mounted a tubeless tire 2. The rim 1 is provided with a valve hole 3 of standard dimensions through which the valve stem, generally indicated by the numeral 4, projects. The valve stem is provided with an axial bore having a metal valve insert or valve tube 5 disposed therein and bonded to the stem for substantially the complete length of the stem. The outer end 6 of the tube 5 projects above the stem 4 and is provided with threads 7 adapted to retain a conventional valve cap (not shown). The internal surface of the tube 5 is provided with threads 8 for securing therein a conventional core (not shown).

The valve stem 4 is provided with an upper portion 9 and a base portion 10 which gradually tapers or decreases in diameter toward the inner end 11 of the tube 5. The upper portion 9 is provided with a slot 12 extending in a conical surface into the upper portion 9, thereby forming a conical head 13 and an annular tubular element 14. A tubular element 14 is provided with a flange 15 which is considerably greater in diameter than the neck 16 which engages the periphery of the valve rim hole 3. The flange 15 bears against the outer surface 17 of the rim adjacent the valve hole. The flange 15 is relatively thick, preferably 3 to 6 times thicker than the thickness of the rim and, therefore, provides a relatively inflexible positive stop to locate the valve axially relative to the hole 3 during the mounting operation and hold the valve normal to the rim surfaces.

In order to provide a seal between the inner periphery of the valve rim hole and the stem, the neck portion 16, or that area of the tubular element immediately below the flange 15, has an outer diameter between 18 and 40% larger than the diameter of the valve rim hole 3. It is thus seen that the inner periphery of the valve rim hole 3 and the outer rim surface 17 adjacent the hole 3 are respectively sealed by compression of the neck 16 and the flange 15. Furthermore, as shown in cross section in Fig. 5 the high compression of the neck between the periphery of the valve rim hole and the tube 5 forces or distorts the rubber neck over and around the inner surface 18 of the rim adjacent the valve hole. The valve rim hole is thereby sealed against the leakage of air.

As previously indicated, the groove or slot 12 functions to increase the radial compression of the neck 16 against the inner periphery of the valve rim hole 3. The slot 12 extends into portion 9 thereby forming a conical surface symmetrical with the axis of the tube 5. The outer surface 19 of the head 13 and the inner surface 20 of the tubular element 14 are parallel to each other and frusto-conical in shape. The slot 12 extends from a radial plane disposed a substantial distance outwardly of the neck portion 16 through the neck portion 16 and terminates in a plane substantially inwardly of the neck portion 16. The base or bottom 21 of the slot 12, or that end of the slot having the larger diameter, terminates inwardly of neck 16 and in the same radial plane as the widest portion of the base 10. Tubular element 14 is thereby integrally connected to the stem by a relatively thin section 22 at the base 21 of the slot 12.

Referring to Fig. 4 of the drawing, the valve stem is easily applied to the rim 1 by manually inserting the base 10 into the valve hole 3 from the outer side 17 toward the inner side 18 of the rim 1 until the wider portion of the base 10 engages the periphery of the hole. An axial force is then applied to the upper end of the tube 5 or head 13 to force the base 10 and the neck portion 16 through the hole 3 so as to seat the neck 16 and flange 15 in and around the valve rim hole. Since the tubular element 14 is connected to the stem by a relatively thin section of rubber 22 and the frictional forces between the external surface of the tubular element 14 and the periphery of the valve rim hole 3 are very great, the rubber within the section 22 elongates axially and the tubular element 14 decreases in diameter as it passes through the valve rim hole. When the outer rim surface 17 adjacent the valve rim hole 3 engages the flange 15, the head 13 will be depressed relative to the surface 23 of the tubular element 14, as indicated by the solid lines in Fig. 5. As the force necessary to insert the valve through the valve rim hole is released, the elongated rubber of the tubular element 14, and particularly section 22, retracts axially so as to increase the compression of the neck in and around the valve rim hole. As the head 13 moves from the depressed position shown in phantom lines in Fig. 5 to the position shown in solid lines in Fig. 5, the outer surface 19 thereof wedges against the inner surface 20 of the tubular element 14 so as to materially increase the compression of the neck 16 against the periphery of the valve rim hole. Furthermore, upon inflation of the tire 2, the inflationary pressure tends to force the head 13 outwardly through the valve rim hole 3 and thereby increases the wedging action of the surface 19 of head 13 against the surface 20 of tubular element 14 to further increase the compression of neck 16 against the periphery of the valve rim hole.

Referring to Fig. 3 of the drawing, a modified form of the invention is shown in which numerals corresponding to those in Fig. 2 represent parts of the stem having similar construction and functions. As seen in the drawings, the construction shown in Fig. 3 is similar to that shown in Fig. 2 except that neck 16 of the tubular element 14 is defined by surfaces 24 and 25 which extend parallel to each other and at an acute angle to a radial plane. In this modification of the present invention, the surface 25 engages the outer surface 17 of the rim 1 and the surface 24 engages the inner surface of the rim 1.

While certain representative embodiments and details have been shown for the purpose of illustrating the invention, it will be apparent to those skilled in this art that various changes and modifications may be made therein without departing from the spirit or scope of the invention.

I claim:

1. A valve stem adapted to be attached to a rim for use with tubeless tires comprising; a metal valve tube, a rubber stem bonded to the valve tube, said rubber stem having a tapered base at one end of said tube, said base decreasing in diameter toward said one end for guiding the valve stem through the valve opening in the rim, the opposite end of said tube being internally threaded to receive a valve core, said rubber stem having a neck portion intermediate the ends thereof for engagement with the valve opening in the tire rim, said neck portion having a diameter substantially larger than the valve opening in the rim, said rubber stem having a flange to engage the radially inner surface of the rim and extending radially of said valve tube in a radial plane positioned between the internally threaded outer end of said tube and said neck portion, and an annular slot in said rubber stem concentric with the axis of said valve tube defining parallel conical surfaces increasing in diameter toward the bottom of said slot and toward the said tapered base, said slot extending through said neck portion and said flange, the smallest diameter of said conical surfaces being located at the outer surface of the flange, whereby the valve stem may be affixed to and removed from the rim from the outer side thereof.

2. A valve stem as claimed in claim 1 in which the bottom of said slot terminates in the same radial plane as the widest portion of said base.

References Cited in the file of this patent

UNITED STATES PATENTS

| | | |
|---|---|---|
| 2,192,572 | Bourdon | Mar. 5, 1940 |
| 2,225,472 | Franklin | Dec. 17, 1940 |
| 2,272,886 | Wilson | Feb. 10, 1942 |
| 2,634,785 | Tubbs | Apr. 14, 1953 |
| 2,769,476 | Herzegh | Nov. 6, 1956 |